Sept. 3, 1935.    A. G. JENSEN    2,013,154

TRANSLATING CIRCUIT

Filed Sept. 8, 1932

INVENTOR
A. G. JENSEN
BY
ATTORNEY

Patented Sept. 3, 1935

2,013,154

UNITED STATES PATENT OFFICE 2,013,154

TRANSLATING CIRCUIT

Axel G. Jensen, South Orange, N. J., assignor to Bell Telephone Laboratories Incorporated, New York, N. Y., a corporation of New York Application September 8, 1932, Serial No. 632,097

6 Claims. (Cl. 178—44)

This invention relates to electrical wave transmission systems and more particularly to coupling devices for high frequency signaling systems.

In the design of high frequency signaling systems there is frequently met the problem of coupling a balanced circuit to an unbalanced one. The difficulty usually involved is to prevent the unbalanced circuit, one side of which may be at ground potential, from disturbing the electrical balance of the other circuit with respect to ground. The maintenance of the balanced condition at high frequencies such as are employed for short wave radio communication is complicated by the fact that the introduction of the slightest difference in the capacitance of the sides of the balanced circuit to ground may materially affect the efficient operation of the system. So critical are such circuits in this respect that special attention must be given to the small capacitances existing between the windings of transformers and other circuit elements. These interwinding capacitances are detrimental not alone because they may unbalance an associated circuit, but also because they may be in effect shunted across the circuit. Where the transformer windings are elements of tuned circuits, any inherent shunting capacitance restricts the size of associated tuning condensers and makes exceedingly critical the adjustment of the circuit. Minute capacitive coupling between primary and secondary windings is also objectionable, since, being generally not measurable, it can not be provided for in the design of the circuit, and irregularities in the transmission characteristics frequently appear.

An object of the present invention is to provide means for coupling an unbalanced circuit to a balanced circuit without disturbing the electrical balance of the latter. More particularly the object of the invention is to provide such coupling means in which capacitive coupling and shunt capacitances are a minimum.

A feature of the invention is a high frequency transformer, the windings of which are so arranged as to minimize capacitive coupling and unbalancing inter-winding capacitances.

Other objects and features of the invention will appear in the following detailed description of a specific embodiment of the invention.

Reference will be made to the accompanying drawing in which.

Figure 1:
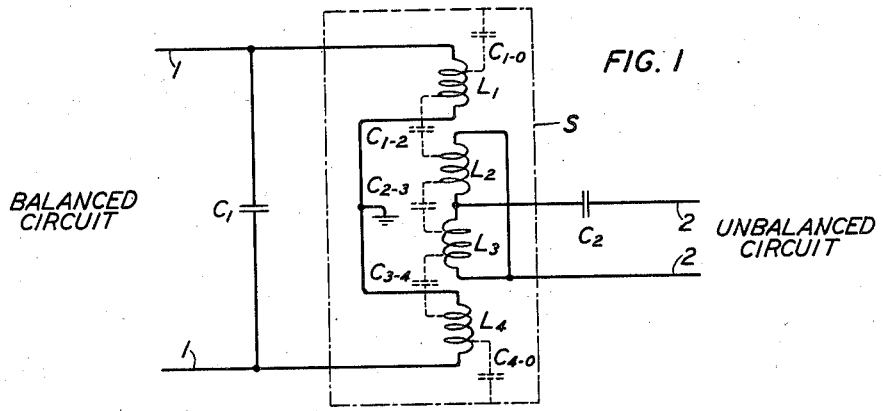
Fig. 1 shows a balanced transformer circuit in accordance with the present invention.

The specific embodiment of the present invention shown in Fig. 1 comprises a balanced transformer, the windings of which are so disposed relatively to each other and so connected as to eliminate the possible unbalancing effect of interwinding capacitances. To the unbalanced circuit are connected in parallel-aiding relation windings $L_2$ and $L_3$. The adjacent terminals of these windings are connected together and to the high potential side of the unbalanced circuit, while the remote terminals are connected together to the other or grounded side of that circuit. These two windings, it will be noted are wound in opposite helical directions. Disposed on opposite sides of the central pair of windings are the series connected windings $L_1$ and $L_4$, the outermost terminals of which are connected to the balanced circuit $l$.

The physical dimensions of the transformer may, of course, be varied without departing from the invention. In one air-cored transformer which was found to operate satisfactorily windings $L_2$ and $L_3$ were solenoidal in form, single layer, and comprised twenty-eight closely wound turns each of No. 27 enameled copper wire wound on a one and three-quarter inch diameter cylindrical form, the separation between windings being three thirty-seconds of an inch. Windings $L_1$ and $L_4$ comprised thirty-four turns each of No. 28 enameled wire wound single layer on one and one-half inch cylindrical forms placed coaxial with the other cylinder, windings $L_1$ and $L_4$ being axially separated from windings $L_2$ and $L_3$ respectively by one-half inch. A container S of copper or other suitable material may be used to shield the transformer against external interference.

Capacitive coupling between primary and secondary windings with this arrangement is practically nil. The terminals of windings $L_1$ and $L_4$ that are connected to the balanced circuit are not adjacent any part of windings $L_2$ and $L_3$ and therefore are not capacitively coupled thereto to any appreciable degree. The other terminals of windings $L_1$ and $L_4$, which are adjacent the parallel-connected windings, are at ground potential. The capacitances $C_{1-0}$ and $C_{4-0}$ which result from the proximity of the high potential terminals of windings $L_1$ and $L_4$ to the grounded shield S may be kept at a satisfactorily low value by using a large shield or by dispensing with the shield.

A capacitor $C_1$ may be connected across the balanced circuit and a capacitor $C_2$ in series with the unbalanced circuit to improve the transmission characteristic of the combination where a relatively narrow band of frequencies is to be passed. For transmitting a frequency band of from 2900 to 3100 kilocycles from an 18,000 ohm balanced circuit to an 80 ohm unbalanced circuit, 29.48 micromicrofarads was found to be a suitable value for $C_1$, and 66.35 micromicrofarads for $C_2$, using the specific transformer hereinbefore described. The total inductance of the balanced windings was in this case 95.5 microhenries and of the unbalanced windings 43.58 microhenries, the coefficient of coupling being 9.95 per cent.

Figure 2:
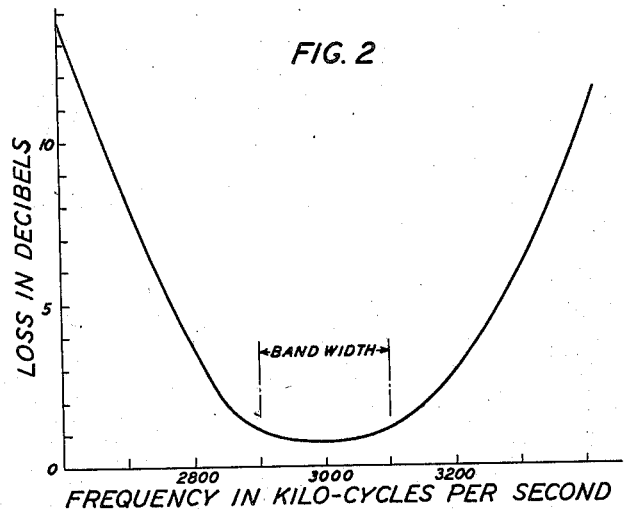
Fig. 2 represents the transmission characteristic of the circuit shown in Fig. 1; and, Fig. 3 shows a balanced modulator utilizing a pair of such transformers.

Fig. 2 shows a typical transmission characteristic of a coupling circuit of the type shown in Fig. 1. Loss in decibels is plotted against frequencies in kilocycles per second. A relatively flat, low loss characteristic is obtained over a 200 kilocycle band.

Figure 3:
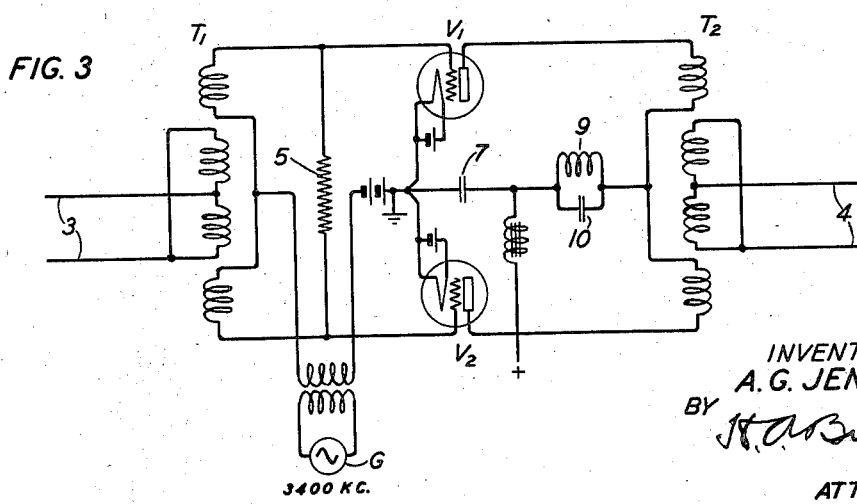

A typical application of a balanced transformer in accordance with the invention is shown in Fig. 3, where transformers $T_1$ and $T_2$ are used to couple a balanced modulator in a signaling circuit. Circuit 3 may be connected, for specific example, to a source of carrier signals ranging in frequency from 200 to 400 kilocycles per second. Transformer $T_1$ is arranged with its parallel windings connected to circuit 3 and with its series windings connected to the grids of triodes $V_1$ and $V_2$. Resistor 5 is connected between the two grids to reduce the tendency of the modulator to generate spurious oscillations. It may be of the order of 600 ohms. A source G of high frequency waves is connected between the midpoint of the balanced windings of transformer $T_1$ and the connection between the respective cathode circuits of triodes $V_1$ and $V_2$. Between the anodes of the two triodes are connected the balanced primary windings of transformer $T_2$, the secondary windings of which are connected to output circuit 4.

In series between the junction of the balanced windings of transformer $T_2$ and the cathodes of the modulator tubes are arranged, in series, blocking condenser 7 and the parallel circuit comprising inductor 9 and capacitor 10. The constants of the latter circuit are so chosen with respect to the frequency of the carrier wave supplied by generator G, which has been indicated as 3400 kilocycles, and the primary parallel-opposing inductance of transformer $T_2$ that the parallel anode circuit of the modulator is series resonant at the carrier frequency. The low impedance thereby obtained is found to reduce materially the tendency of the modulator to oscillate at carrier frequency and to aid in the suppression of carrier current in the output circuit.

The output impedance of the modulator may be, for example, of the order of 20,000 ohms, while the impedance of circuit 4 in a typical case may be 80 ohms.

What is claimed is:

1. In a high frequency transmission system, a balanced circuit, an unbalanced circuit and a transformer coupling said circuits, said transformer comprising a first pair of windings axially spaced and connected to said balanced circuit in series aiding relation, and a second pair of windings arranged axially intermediate and in symmetrical relation to said first pair of windings and connected symmetrically in parallel to said unbalanced circuit, the outer terminals of said first pair of windings being connected to said balanced circuit.

2. In a signaling system, a balanced circuit, an unbalanced circuit and a high frequency air-cored transformer coupling said circuits, said transformer comprising four solenoidal windings disposed along a common axis, one pair of said windings being connected in series-aiding relation with their remote terminals connected to said balanced circuit, the other pair of said windings being axially intermediate and symmetrically coupled to said first pair of windings and connected symmetrically in parallel-aiding relation to said unbalanced circuit.

3. In a high frequency transmission system, a balanced circuit, an unbalanced circuit, and a transformer coupling said circuits, said transformer comprising a pair of parallel connected windings connected at their electrical junction points to said unbalanced circuit, a pair of balanced windings connected in series and symmetrically disposed about said first pair of windings, only the portions of said first pair of windings that are connected to the low potential side of said unbalanced line being in close proximity to said second pair of windings, and connections from the outermost terminals of said pair of balanced windings to said balanced circuit.

4. In a high frequency transmission system, a transformer comprising two pairs of windings, means to connect one pair of said windings conductively in parallel to a first pair of terminals, means to connect the other of said pair of windings in series to a second pair of terminals, a circuit unbalanced to ground connected to said first pair of terminals and a balanced circuit connected to said second pair of terminals, only the low potential ends of said other pair of windings being adjacent said first pair of windings, and the high potential ends of said other pair of windings being non-adjacent each other.

5. In a signaling system, a balanced circuit, an unbalanced circuit and a high frequency air-cored transformer coupling said circuits, said transformer comprising four non-overlapping windings disposed along a common axis with the ends of the inner pair of said windings that are adjacent the other pair of said windings conductively connected together and to the low potential side of said unbalanced circuit and the other ends of said pair of windings connected together and to the other side of said unbalanced circuit, the outermost ends of the other pair of said windings being connected to said balanced circuit and the inner ends connected together.

6. In a signaling system, a balanced circuit, an unbalanced circuit and a transformer coupling said circuits, said transformer comprising a first pair of windings symmetrically connected in parallel to said unbalanced circuit, and a second pair of windings symmetrically coupled to said first pair of windings and connected in series to said balanced circuit, the ends of said second pair of windings that are the more closely capacitively coupled to said first pair of windings being connected together.

AXEL G. JENSEN.